(12) United States Patent
Suckling et al.

(10) Patent No.: US 7,931,396 B2
(45) Date of Patent: Apr. 26, 2011

(54) BACKLIGHT AND DISPLAY

(75) Inventors: James Rowland Suckling, Surrey (GB); Tong Zhang, Oxford (GB); David James Montgomery, Oxford (GB); Ioannis Papakonstantinou, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 281 days.

(21) Appl. No.: 12/331,901

(22) Filed: Dec. 10, 2008

(65) Prior Publication Data

US 2010/0142223 A1    Jun. 10, 2010

(51) Int. Cl.
*F21V 8/00* (2006.01)
*G02B 6/00* (2006.01)

(52) U.S. Cl. ........ 362/628; 362/617; 362/330; 362/339; 362/615; 362/613

(58) Field of Classification Search .............. 362/615, 362/613, 628, 330, 339, 617
See application file for complete search history.

(56) References Cited

U.S. PATENT DOCUMENTS

| | | | |
|---|---|---|---|
| 7,067,753 B1 * | 6/2006 | Cheng | |
| 7,156,548 B2 * | 1/2007 | Teng et al. | |
| 7,325,958 B2 * | 2/2008 | Yang et al. | |
| 7,703,967 B2 * | 4/2010 | Parker | 362/606 |
| 7,873,256 B2 * | 1/2011 | Gardiner et al. | 385/146 |
| 2004/0130912 A1 * | 7/2004 | Miyashita | 362/561 |
| 2004/0246601 A1 * | 12/2004 | Okuwaki et al. | |
| 2004/0246697 A1 * | 12/2004 | Yamashita et al. | |
| 2006/0291247 A1 | 12/2006 | Kao et al. | |
| 2008/0025687 A1 | 1/2008 | Lee et al. | |
| 2008/0247191 A1 | 10/2008 | Hsu | |

FOREIGN PATENT DOCUMENTS

| | | | |
|---|---|---|---|
| EP | 1 876 482 A1 * | 6/2007 | |
| EP | 1 876 480 A1 | 1/2008 | |
| EP | 1 906 218 | * | 4/2008 |
| EP | 1 906 218 A1 | 4/2008 | |
| JP | 2004-327096 | * | 11/2004 |
| JP | 2008-257252 A1 | 10/2008 | |
| WO | 02/04858 | * | 1/2002 |
| WO | 2006/080710 | * | 8/2006 |

OTHER PUBLICATIONS

International Search Report for corresponding Application No. PCT/JP2009/070931 mailed Jan. 19, 2010.

* cited by examiner

*Primary Examiner* — Stephen F Husar
*Assistant Examiner* — James W Cranson
(74) *Attorney, Agent, or Firm* — Renner, Otto, Boisselle & Sklar, LLP

(57) ABSTRACT

A backlight is provided for illuminating an at least partially transmissive display. The backlight includes a light source. A light guide receives the light from an edge surface and guides the light by total internal reflection. Groove structures which are located on at least one of the major surfaces of the light guide permit redistribution of light around obstacles that may be present within the light guide structure, thereby maintaining brightness uniformity of the backlight or illumination panel.

24 Claims, 15 Drawing Sheets

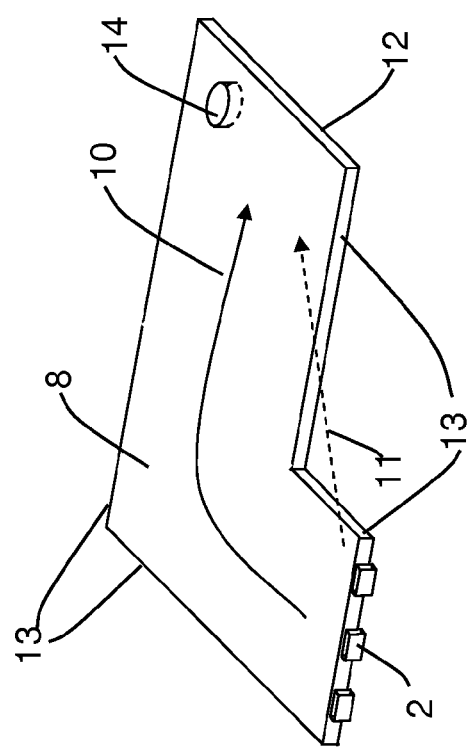
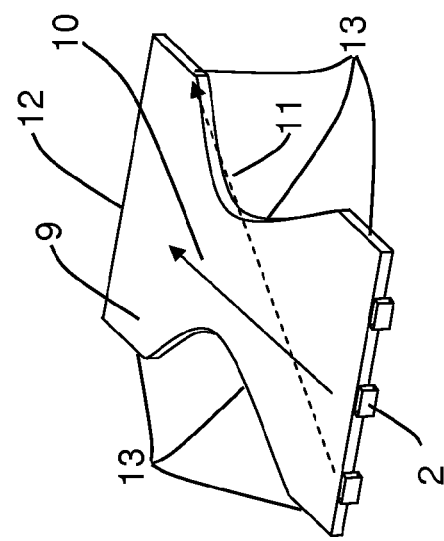
Figure 2a
Figure 2b

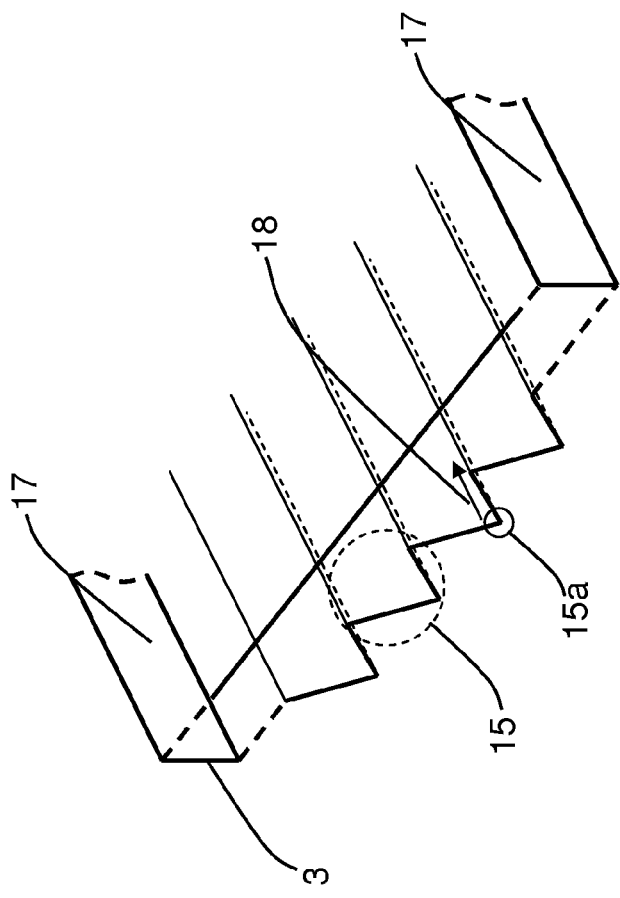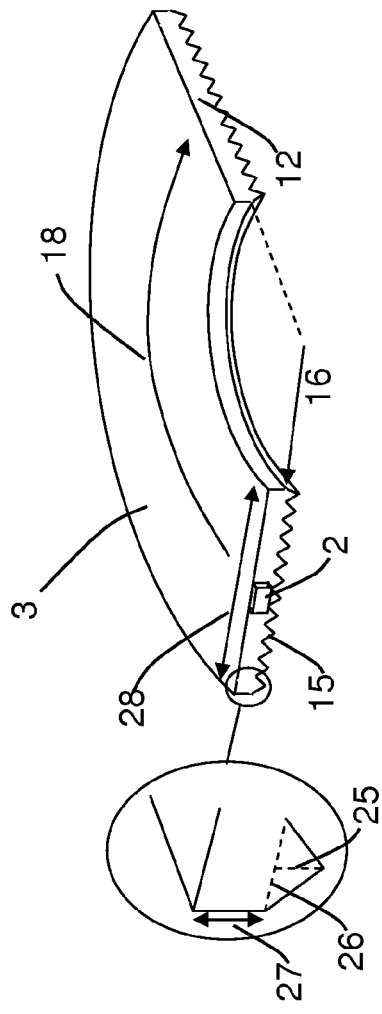

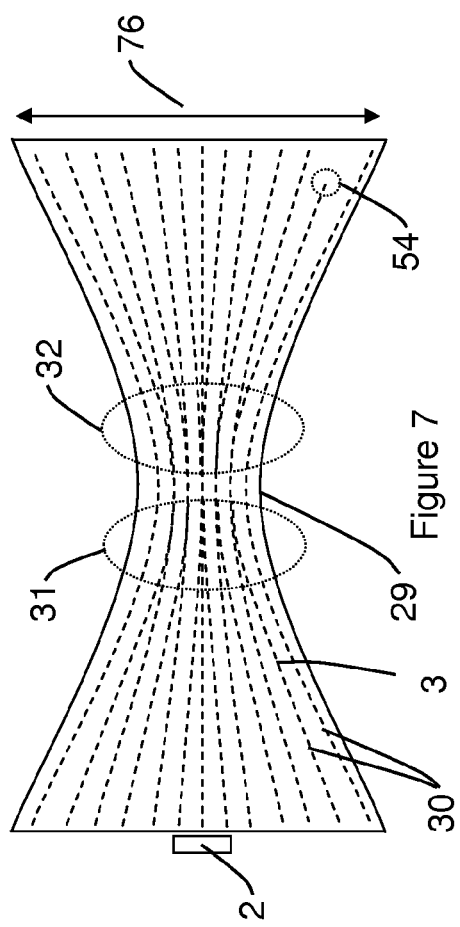
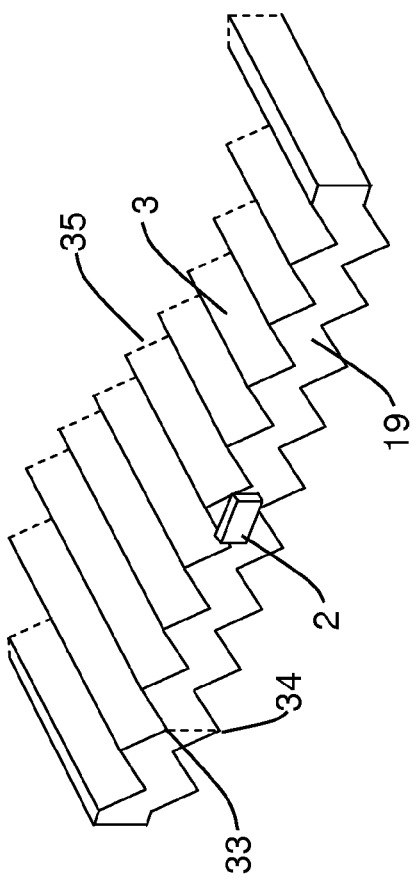

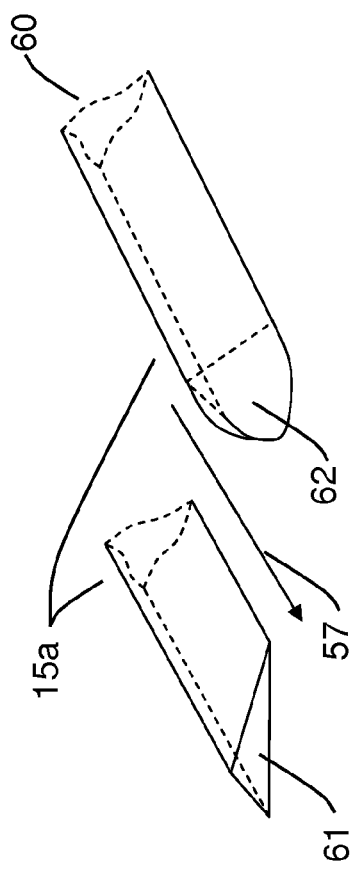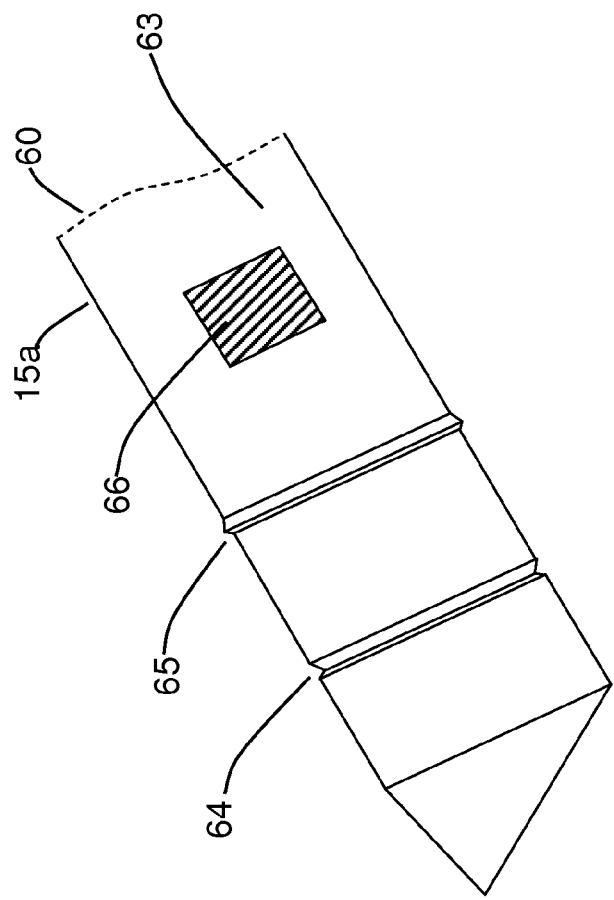

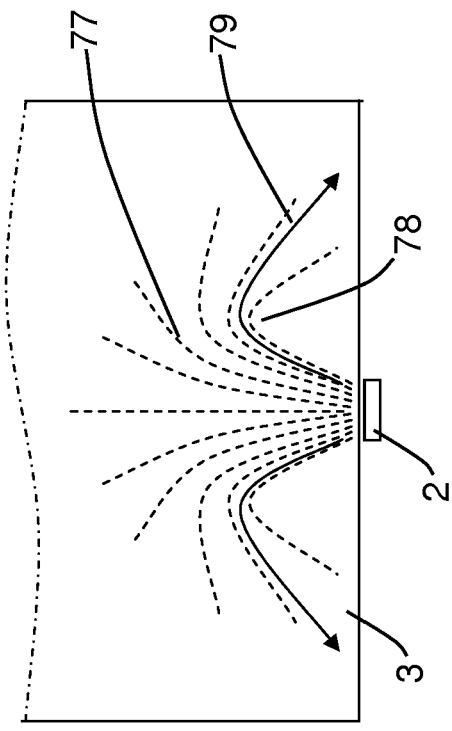
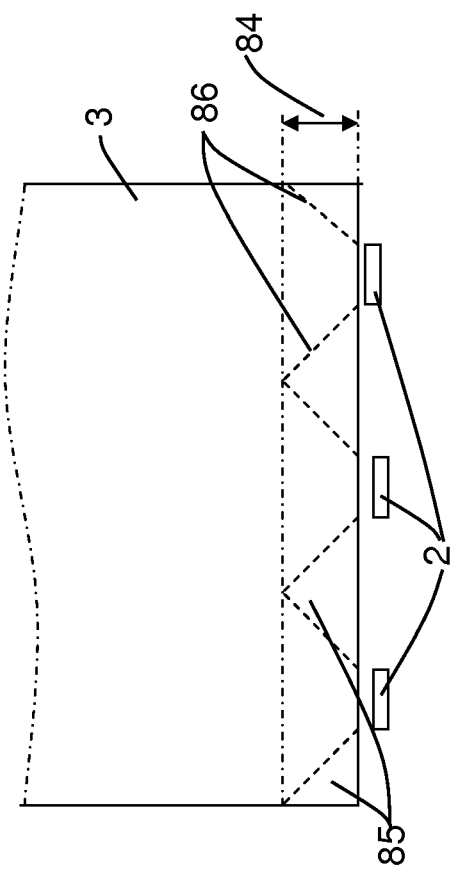

BACKLIGHT AND DISPLAY

TECHNICAL FIELD

The present invention relates to a backlight, for example for use with an at least partially transmissive spatial light modulator. The present invention also relates to a display including such a backlight. Moreover, the present invention relates to a distributed illumination panel that may be used for general illumination.

BACKGROUND OF THE INVENTION

FIG. 1 of the accompanying drawings illustrates the stack structure of a typical liquid crystal display (LCD) module. The display 1 comprises a flat transmissive spatial light modulator (SLM) in the form of an LCD panel having input and output polarisers on its bottom and top sides. The rest of the structure is generally regarded as the backlight system, as follows. A light source 2 emits light, which is coupled into a light guide 3 and distributed across the back of the display 1 by way of total internal reflection (TIR) in such a way that if no scattering structures were present the light would travel until it reached the end of the light guide. Furthermore, the top and bottom major surfaces of the light guide are generally smooth and flat such that the average direction of the light within the light guide is not deviated from its initial average direction of propagation. However, within the light guide there are multiple scattering structures 4 that extract the light from the light guide to illuminate the LCD panel by disrupting the TIR conditions at the surface of the light guide on which they are located 5, hence allowing the light to pass through the air light guide interface. These scattering features may be located on either the top or bottom major light guide surfaces. The density of the light scattering features may increase with distance from the light source to maintain a uniform rate of extraction of the light along the length of the light guide. As light is extracted both down and up from the light guide, a reflecting film 6 is placed beneath the light guide to improve the efficiency of the backlight. There are also some optical films 7 between the light guide and the LCD panel, placed to give better illumination uniformity over the display area and to enhance brightness within a given viewing angle range. The nature of these films is well known and will not be described further here.

It would be useful at this point to define an item of terminology. The average direction of the light is defined as a single vector which indicates the sum of all the light direction vectors within the light guide. This may also apply to the light within a smaller region of a light guide. In a rectangular light guide that is evenly illuminated from one end, the average direction of light is directly away from the light source, perpendicular to the plane of the input face. This is the same regardless of light source, as long as the light source is located at one end of the light guide only. The average direction may also be discussed in terms of the direction of light within a smaller area than the full light guide.

Some conventional devices utilize grooves on one or more major surfaces of a light guide to allow for improved uniformity of the extracted light. For example:

In EP 1 876 480 A1 (Samsung) grooves are arrayed on one or both sides of the light guide. The grooves on the bottom are aligned parallel to the light direction. The grooves on the top are aligned perpendicular to the light direction and are used as extraction features. The upper ones are non-uniform in size and apex angle. The non-uniformity in groove dimension helps maintain brightness uniformity of the extracted light. The lower grooves do not alter size.

In EP 1 876 482 A1 (Samsung) uniform grooves may be arrayed on one or both sides of a light guide. The grooves can be parallel to the average light direction or may be arranged substantially perpendicular to the light direction to act as extraction features. Point features are added to the extraction grooves to aid in diffusion of the light towards an overlying display.

WO 02/04858 A2 (3M) describes grooves on one or both major surfaces of a light guide. The grooves on the lower surface are parallel to the light direction however, they are non-uniform. They may change their direction or linear structure to maintain the uniformity of extraction. The cross section may be triangular, arc or flat. The reference also describes a similar structured but arranged as a Fresnel-like lens.

US 2006/0291247 A1 (AU Optronics) describes grooves on one or both sides of a light guide. The grooves on the top surface are not designed as extraction features. Rather, having a constant cross section but a position that changes to create wave-like features the groove structure is designed to prevent Moiré interference between the light guide structure and the liquid crystal panel.

In EP 1 906 218 A1 (Samsung) grooves are arrayed on both top and bottom surfaces of a light guide. On the top surface the grooves are aligned parallel to the light direction. On the bottom surface there are two sets of orthogonal grooves, one set parallel to the light, the other set perpendicular to the light direction. The two sets of grooves intersect to create extraction regions whilst still maintaining good uniformity of the light distribution within the light guide.

In WO 2006/080710 A1 (Cheil Industries Inc.) sets of grooves on both the top and bottom major surfaces of the light guide are used. The top set of grooves is aligned parallel to the light direction. The bottom sets of grooves are arranged in discrete patches so that extraction is not achieved at all points of the bottom surface. Whilst the general alignment of the grooves within the patches is to be perpendicular to the light direction, some patches may have an alternate orientation. This is to further improve uniformity of the light extracted from the light guide.

Some conventional devices utilize grooves on the input, or light receiving, surface of a light guide to widen the input angular distribution and hence improve the uniformity. For example:

US 2004/0246601 A1 (Citizen Electronics Co Ltd) describes the use of grooves aligned vertically on the light receiving surface of a light guide to widen the input angular distribution of the light. Two sets of interlaced grooves with different apex angles are described to give two distinct input profiles, allowing a wider angular distribution of the light within the light guide.

Other, similar devices, are described in U.S. Pat. Nos. 7,067,753 B1, 7,325,958 B2 and JP 2004327096A.

U.S. Pat. No. 7,156,548 B2 (Innolux Display) describes a light guide that may have grooves on one or both major surfaces which are arranged as extraction features. The grooves are arrayed nominally perpendicular to the direction of the light within the light guide. The depth, separation and apex angle of the grooves control the strength of the extraction and the relative angle of the surfaces of the grooves the direction of the extracted light.

US 2004/0246697 A1 (Yamashita) describes grooves cut into one surface of the light guide. They may have a prism or lens structure. The grooves are designed to enhance the uniformity of the light guide but not to extract the light itself. They are aligned nominally parallel to the direction of the light.

Current LCD utilization is in the form of a rectangular screen the under side of which is illuminated by the backlight arrangement described above. Such a shape of display is provided with uniform light which has been distributed by TIR within the light guide. However, a display, or general lighting illumination panel, may need to be designed to have a shape other than a rectangle or square. These could include, by way of example, light guides that trace an in-plane turn, light guides with intrusive cuts made into the minor side surfaces or light guides with a hole made in the middle, from bottom to top major surfaces. Examples of the first two shapes may be an L-shaped light guide 8 or an hour-glass shaped light guide 9 respectively, as demonstrated in FIGS. 2a and 2b. Possible positions for the light sources 2 and resulting direction of light travel 10 within these light guides are shown. The possible shapes of light guide and number and position of light sources should not be limited to these examples.

In these instances it is conceivable that there will be a significant shadow region caused, whereby light emitted from the light source has no direct optical path to a region in the lea of such a feature, denoted by 11 for both cases in FIGS. 2a and 2b. The definition of "direct optical path" should be clarified to mean a straight line that can be drawn from the location at which light is coupled into a light guide, from a light source, to the region of interest without intersecting a side wall of the light guide, thereby causing the line to leave the confines of the material of the light guide. Fundamental to this is the range of angles that the light may take on coupling into the light guide which is limited by the refractive indices of the light guide and the surrounding medium; this results in a cone inside of which light may propagate, but outside of which it may not. Therefore, a region of the light guide outside of this cone is deemed to not be on a direct optical path from the light source.

Reflection of light from the far end of the light guide 12 and from the side walls 13 will go some way to provide illumination to the shadow region, but there will still be significant reduction of brightness uniformity of the display in this shadow area. This issue may relate to both a light guide punctured by a hole 14 from top to bottom major surfaces and one with intrusions cut into the sides (the hour glass or L-shaped light guide examples of the latter). Additionally, designs incorporating intrusions or holes will suffer from significant losses of light at the obstruction, or intrusion, surface nearest the light source. This loss will occur as TIR requires that the incident angle of the light upon an interface from high to low refractive index is above a critical angle to the normal of the interface, defined by the arcsine of the ratio of the refractive indices; in this case those of the light guide and the surrounding medium. At smaller angles of incidence the light will be allowed to pass through the interface and be extracted from the light guide. The relative angle of the intrusion surface to that of the light path will no longer satisfy this criterion in the majority of cases and hence strong transmission of light will occur out of the light guide.

Providing minor side surfaces (such as those indicated by 13 in FIGS. 2a and 2b) that are reflective via the application of a layer of metal, for example, may aid in the redistribution of light within the light guide and mitigate transmission loses. However, reflection efficiency at these surfaces will never be perfect, unlike that occurring during TIR. Furthermore, the inclusion of a metal surface in the design will add another manufacture step and may itself cause a shadow region, dependent on the application method and position. The best method of prevention of light loss is to reduce the amount of light actually interacting with any intrusive surfaces.

The re-distribution of light within a light guide may be termed sub-guiding. It represents the distribution of light within a larger light guiding structure in such a way that is nominally independent of the larger shape of the light guide and the angular and positional distribution of LEDs.

SUMMARY OF THE INVENTION

According to an aspect of the invention, a light guide is provided for use in distributing light received from a light source. The light guide includes a plate-like substrate through which light may travel, the substrate having a top major surface, a bottom major surface and a light input face. The substrate includes at least one region where light received at the light input face cannot reach by direct optical path through the substrate to the at least one region. The substrate further includes a plurality of grooves on at least one of the top major surface and the bottom major surface, the plurality of grooves being aligned in a direction which is parallel to a direction of the light input at the light input face, and the plurality of grooves including grooves having a direction which varies non-linearly so as to direct light from the light input face toward the at least one region.

According to another aspect, the substrate is non-rectangular.

In accordance with another aspect, the substrate includes an in-plane turn having a radius of curvature, a straight-line path from the light input face to the at least one region traverses a gap in the substrate formed by the radius of curvature, and the grooves included among the plurality of grooves vary in direction in conjunction with the radius of curvature.

In accordance with still another aspect, the substrate includes an L-shape, a straight-line path from the light input face to the at least one region traverses a gap in the substrate formed by an inner angle of the L-shaped substrate, and the grooves included among the plurality of grooves vary in direction in conjunction with a path along the inner angle.

According to yet another aspect, the substrate includes a hole extending thru the top and bottom major surfaces, the at least one region exists on a side of the hole opposite a side adjacent the light input face, and the grooves included among the plurality of grooves vary in direction to direct the light from the light input face to the at least one region.

In still another aspect, the substrate includes a cut made into a minor side wall of the substrate extending thru the top and bottom major surfaces, the at least one region exists on a side of the cut opposite a side adjacent the light input face, and the grooves included among the plurality of grooves vary in direction to direct the light from the light input face to the at least one region.

In yet another aspect, the substrate has an hour glass shape.

According to another aspect, the grooves having a direction which varies non-linearly include grooves which undergo a change in direction greater than 90°.

According to yet another aspect, extraction features are included for extracting light from the light guide.

In accordance with another aspect, the extraction features include at least one of an indent, protrusion or rough patch on a surface of one or more of the plurality of grooves.

According to still another aspect, the extraction features include protrusions on a surface of the light guide opposite the surface including the plurality of grooves.

With still another aspect, the plurality of grooves represent elongated lenses.

In yet another aspect, at least one of the pitch and number of the grooves directing the light toward the at least one region changes.

In accordance with still another aspect, at least one of an apex angle and spacing of the grooves directing the light toward the at least one region changes.

According to another aspect, wherein the plurality of grooves includes grooves formed on the top major surface and grooves formed on the bottom major surface.

In yet another aspect, the grooves formed on the top major surface are interleaved with the grooves formed on the bottom major surface.

According to still another aspect, the plurality of grooves have a cross-section that is at least one of triangular, arcuate, rectangular or square.

According to another aspect, the light guide includes a mixing region at the light input face to enable light from separate light sources to become more homogenised.

In still another aspect, a backlight is provided. The backlight includes a light guide as described herein and at least one light source providing the light input at the light input face.

In accordance with another aspect, the at least one light source includes a plurality of light sources positioned along the light input face for introducing light into the light guide; and the grooves included among the plurality of grooves vary in direction to direct light received from a given one of the plurality of light sources into the at least one region represented by an area in the substrate between the given light source and an adjacent one of the plurality of light sources, the area being an area which would otherwise not receive light from the plurality of light sources.

According to another aspect, the plurality of grooves includes additional grooves aligned to direct light received from the adjacent light source into the area between the given light source and the adjacent light source where the light from the given light source and the adjacent light source becomes mixed.

In accordance with still another aspect, the grooves directing the light received from the given light source into the area exhibit a change in direction greater than 90°.

According to still another aspect, the substrate includes extraction features within the area for extracting light from the light guide.

According to another aspect, a display is provided which includes a transmissive spatial light modulator in stacked combination with a backlight as described herein.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 2a and 2b illustrate typical examples of light guide shapes for which the light guide of the present invention is particularly suited;

FIG. 3 is a perspective view in cross section of a light guide in accordance with an embodiment of the present invention;

FIG. 4 is a perspective view of a light guide shaped to follow an in-plane turn in accordance with an embodiment of the present invention;

FIG. 7 is a plan view of a light guide having varying width in accordance with an embodiment of the present invention;

FIG. 8 is a perspective view of the light input face of a light guide with parallel and in-phase grooves on opposing major surfaces in accordance with an embodiment of the present invention;

FIGS. 14 and 15 illustrate in perspective various types of groove terminations in accordance with an embodiment of the present invention;

FIG. 16 illustrates different types of extraction features formed on the walls of grooves in accordance with an embodiment of the present invention;

FIG. 21 is a schematic top view of a light guide including grooves for reversing direction of the light in accordance with another embodiment of the present invention; and FIG. 22 is a schematic top view of a light guide including a homogenizing region in accordance with another embodiment of the present invention.

DETAILED DESCRIPTION OF THE INVENTION

Figure 1:
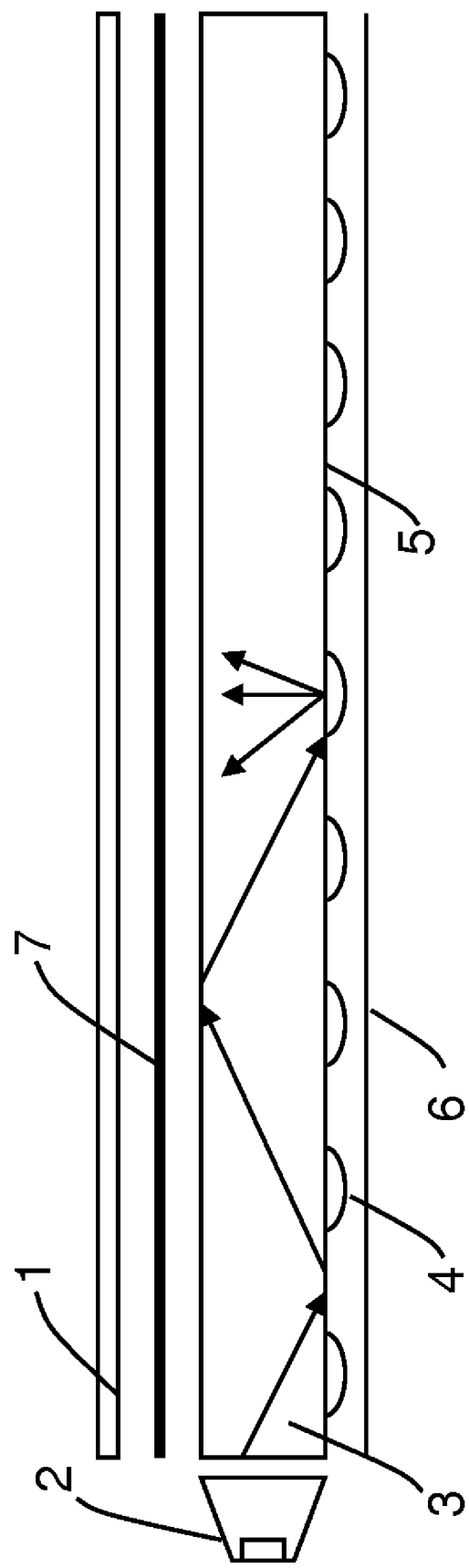
FIG. 1 illustrates a stack structure of a typical liquid crystal display module.

The present invention will now be described in detail with reference to the drawings, in which like reference numerals are used to refer to like elements throughout.

In accordance with the present invention, light may be sub-guided within a light guide such that change in direction of propagation of the light may be by any angle in the plane of the light guide and allow re-distribution of the light to improve brightness uniformity. Particularly, changes in light propagation direction greater than 90° may be achieved. Referring to FIG. 3, the sub-guiding is made by the inclusion of grooves 15 with apexes 15a onto one or more major surfaces of the light guide 3. The grooves 15 will have a direction 18 which, for ease of reference, is herein defined by the direction of the apexes 15a. The angle of TIR of the light on the surfaces of the grooves 15 alters the direction of propagation of the light and hence gives rise to the sub-guiding ability. This is in contrast to a light guide with flat major surfaces whereby the only change in direction that light may make is via reflection of the minor side walls 17. This latter case may lead to heavy loss of light at any light guide surface at an obstruction.

Figure 5:
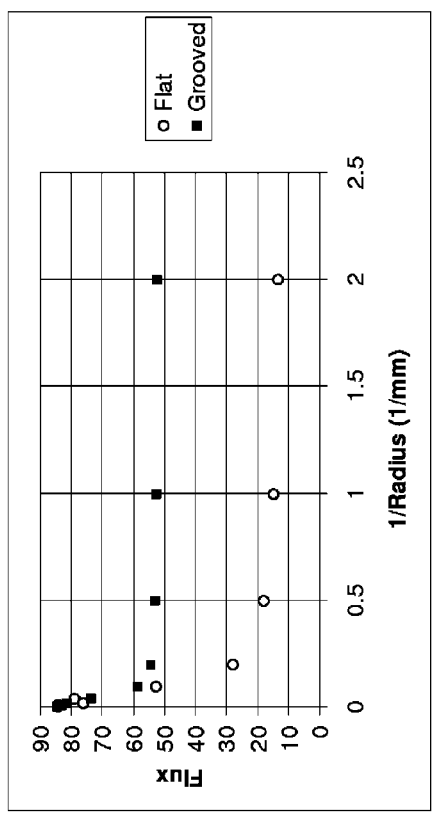
FIG. 5 is a graph comparing a light guide in accordance with the present invention with a conventional light guide.

By way of example, FIG. 4 shows a light guide which is shaped to follow an in-plane turn with a radius of curvature defined by that of the inner edge 16. The position of the light source 2 is marked and the amount of light reaching the far end surface 12 is measured as a function of radius of curvature 16 for a light guide with a flat bottom and one with a grooved bottom surface 15 and the results displayed in FIG. 5. The light guide has a depth 27 of 0.6 mm, and a width 28 of 20 mm. The grooves each have a depth 25 of 0.1 mm and pitch 26 of 0.2 mm, giving rise to 100 grooves across the bottom surface of the light guide and they are aligned to follow the arc of the radius, perpendicularly intersecting the light input face and light exit face; their direction is denoted by 18. The groove structure, indicated by 15, is not drawn to scale. The improved guiding within the light guide provided with grooves is clearly demonstrated in FIG. 5 with four times the light guided successfully to the end surface compared with that of a flat bottom surface for a 2 mm radius of curvature. The light guide depth chosen is thicker than a typical mobile device; however, the proportion of light guided by a groove structure will increase as the light guide thickness is reduced.

The grooves do not need to follow any one particular arc radius or direction of curvature per application on a light guide, giving free control of the local average direction of light at any point within that light guide. This would be of particular advantage in light guides whose geometry is defined by aesthetic or ergonomic requirements over other considerations.

Furthermore, an array of grooves will not completely confine the light within the bounds of their structure which has the advantage that the percentage of the light diverted away from the initial average direction may be controlled by either the pitch of the grooves, the total width of the groove structure or the depth of the grooves themselves. Therefore, the situation that the grooves may divert too much light away from the initial average direction and themselves cause a shadow region by their existence, may not necessarily arise.

Lastly, the grooves may be formed in a one step injection molding process. This has the advantage that no further manufacturing steps are required to add the grooves to the light guide structure, which may be required for a metallization process, for example. This will allow costs to be kept to a minimum.

Figure 6:
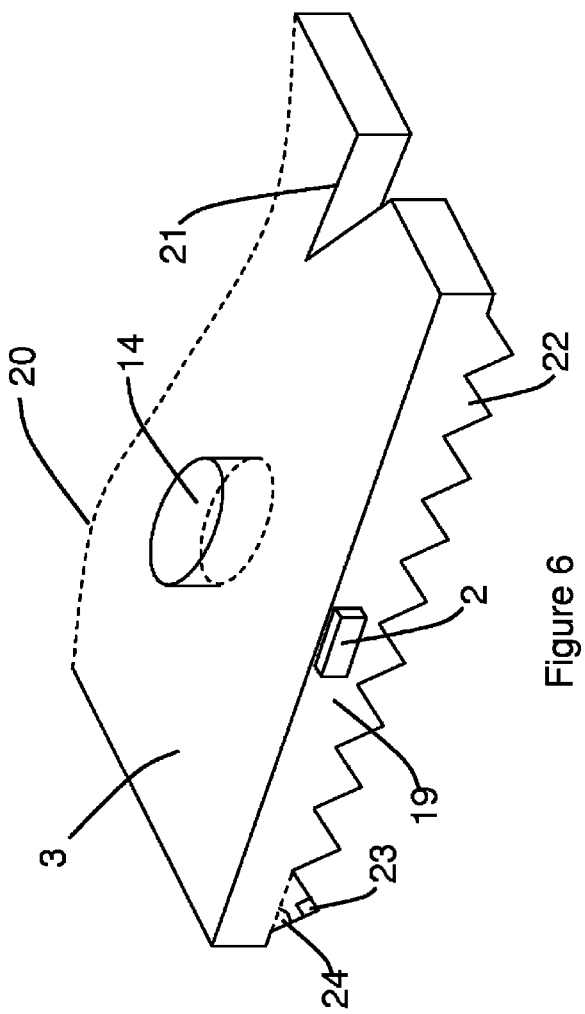
FIG. 6 is a perspective view of the light input face of a light guide having obstructions in accordance with an embodiment of the present invention.

FIG. 6 shows a view of the light input face of a light guide representing an exemplary embodiment of the invention. The light input face 19 is shown with example point light source 2. However, as the subsequent in-plane shape of the light guide is not important to the invention it is left out of the illustration and the curved, dashed line 20 represents an arbitrary cut off point, as opposed to a defined end point to the light guide. The light guide for backlight or illumination panel will be substantially flat, i.e. it does not curve out of the plane of the major surfaces. The light guide will have a shape with an obstruction that creates a shadow region with reduced brightness uniformity. Two examples of such obstructions are shown in FIG. 6 as a hole 14 made from top to bottom major surfaces and a cut 21 made into the minor side wall of the light guide. The ends of the grooves provided to redirect light into the shadow region are denoted by 22. The grooves themselves should be longer along one axis than the other, taking the form of elongated lens type features on the major surface of the light guide. As the direction of the groove in the plane of the major surface of the light guide defines the direction of the sub-guided light it may not be restricted to any single vector and may change as a function of length along the light guide. This change of direction may be through the shape of an arc, or curve, and may take a variable radius or direction of turn as a function of length along the light guide. The preferable cross-section of each groove is triangular with an apex angle 23 of 90° and equal angles 24 to the horizontal on each side of the base of 45°, describing a right angled, isosceles cross-section. The depth of the grooves may remain constant and therefore so does the pitch of the grating structure that the multiple grooves form. Thus, if the width of the light guide was to change as a function of length, so may the number of grooves, to maintain this pitch. As such, there is no upper or lower limit on the number of grooves that may exist across the width of the light guide. This change in number of grooves is shown in FIG. 7, which shows the plan view of a light guide of varying width 76 with a waist in the middle 29 and an example light source 2 location. The apexes of individual grooves are denoted by the dashed lines 30 and points of groove splitting and joining are shown as 31 and 32 respectively.

The following describes modifications to the exemplary embodiment that constitute further embodiments to the invention.

The grooves may be located on both major surfaces of the light guide 3 as opposed to just the one, as shown in FIG. 8. Both sets of grooves would be parallel and in-phase such that the indents 33 of one set of grooves are opposite to the protrusions 34 of the opposing set. This may be undertaken to improve the sub-guiding of the light. A possible light source 2 location is shown for reference on a light input face 19 and the dashed region 35 represents an arbitrary cut off to the diagram, not light guide structure.

Figure 9:
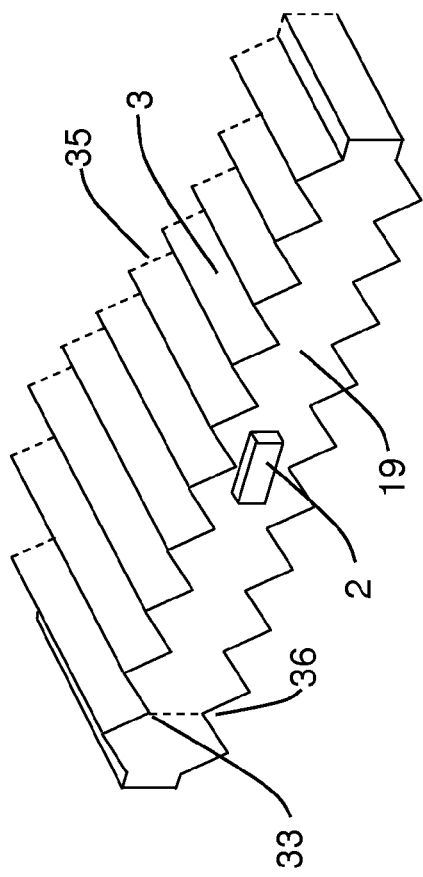
FIG. 9 is a perspective view of the light input face of a light guide with parallel and out-of-phase grooves on opposing major surfaces in accordance with an embodiment of the present invention.

Alternatively, the sets of grooves may be out of phase, such that the indents are directly opposite each other across the light guide, as denoted by 33 and 36 in FIG. 9. Again, this may be undertaken to improve the sub-guiding of light and 35 represents an arbitrary cut-of to the diagram, not a light guide structure.

Figure 10:
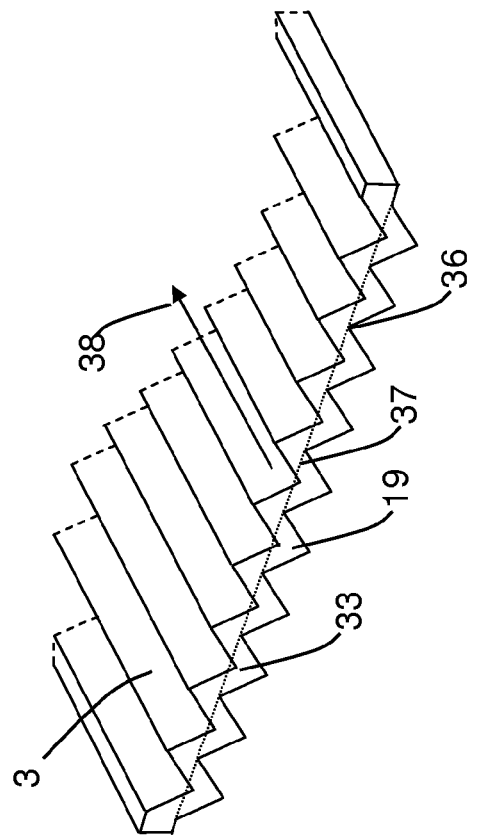
FIG. 10 is a perspective view of the light input face of a light guide with interleaved parallel and in-phase grooves on opposing major surfaces in accordance with an embodiment of the present invention.

In the case of the in-phase groove structures, the grooves may be indented so far into the major surfaces of the light guide that they are interleaved. This is demonstrated by the groove indent 33 being lower than the dotted line 37, which is coincident with the indents 36 of the grooves on the bottom major surface as illustrated in FIG. 10. By this embodiment, no line of sight may be achieved across the width of the light guide, along the dotted line 37. However, this overlap will not cause a shadow region, as illumination is provided to propagate perpendicular to the light input face 19, along a direction indicated by the arrow 38.

Figure 11:
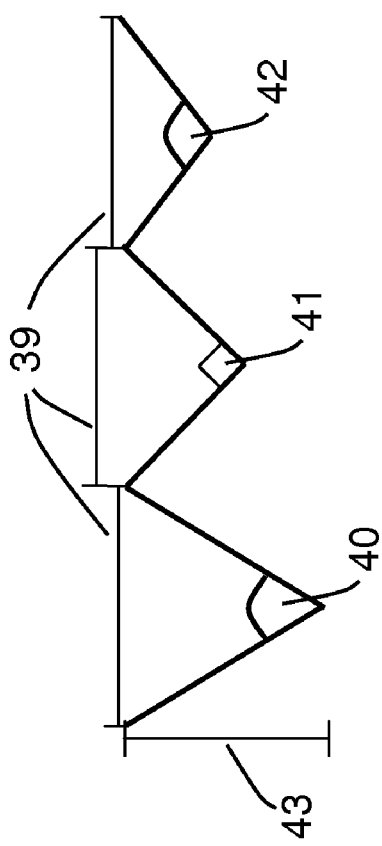
FIG. 11 is a schematic representation of a light guide in which the pitch of the grooves is constant and the apex angle and the depth of the grooves are different in accordance with an embodiment of the present invention.

FIG. 11 shows another embodiment of the invention where the pitch 39 of the grooves is kept constant but the apex angle (40, 41, 42) is changed. The grooves are viewed end on. If the apex angle 40 is reduced relative to the 90° apex angle 41, the depth of the groove 43 will increase and so will the ability of the groove structure to sub-guide light. Alternatively, if the apex angle (e.g. 42) is increased the sub-guiding is reduced.

Figure 12A:
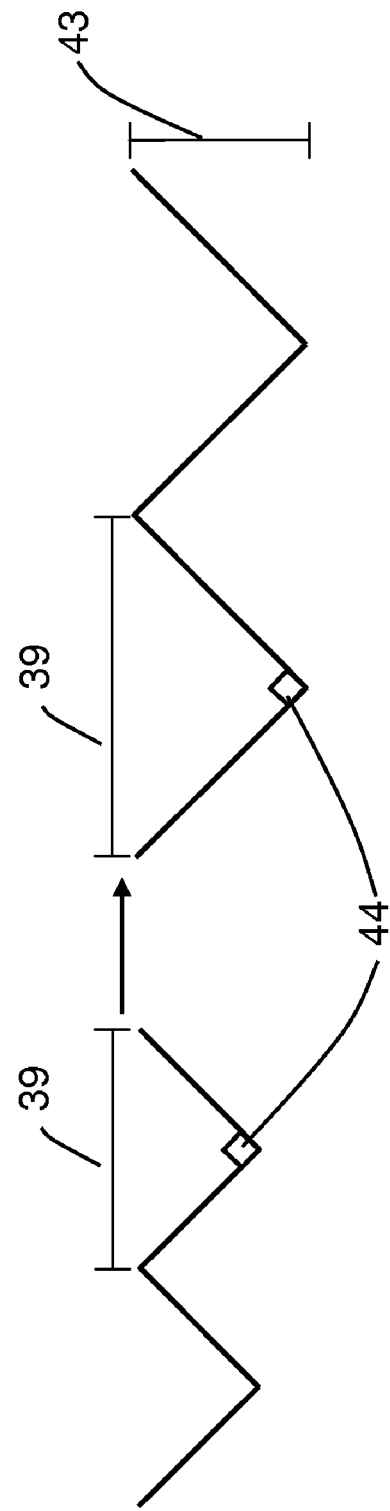
FIG. 12a is a schematic representation of a light guide having grooves with varying pitch and depth and constant apex angles in accordance with an embodiment of the present invention.
Figure 12B:
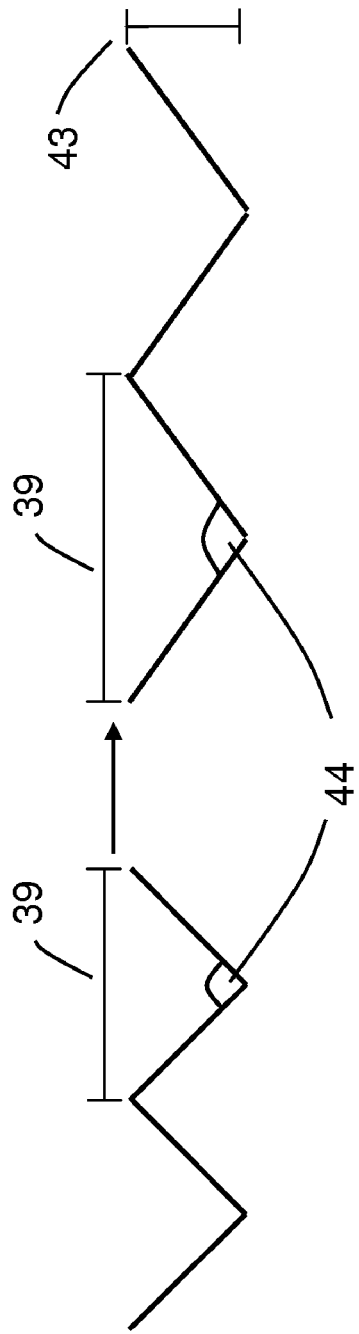
FIG. 12b is a schematic representation of a light guide having grooves with varying pitch and apex angles and constant depth in accordance with an embodiment of the present invention.
Figure 12C:
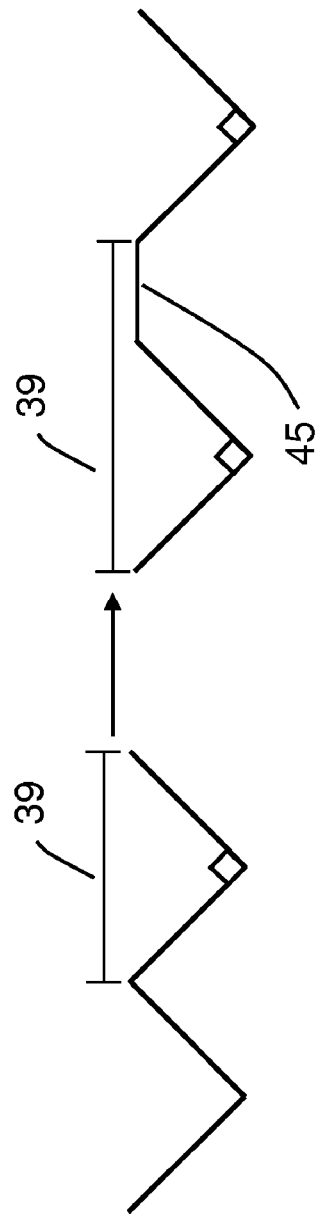
FIG. 12c is a schematic representation of a light guide having grooves with varying pitch using flat regions in accordance with an embodiment of the present invention.
Figure 12D:
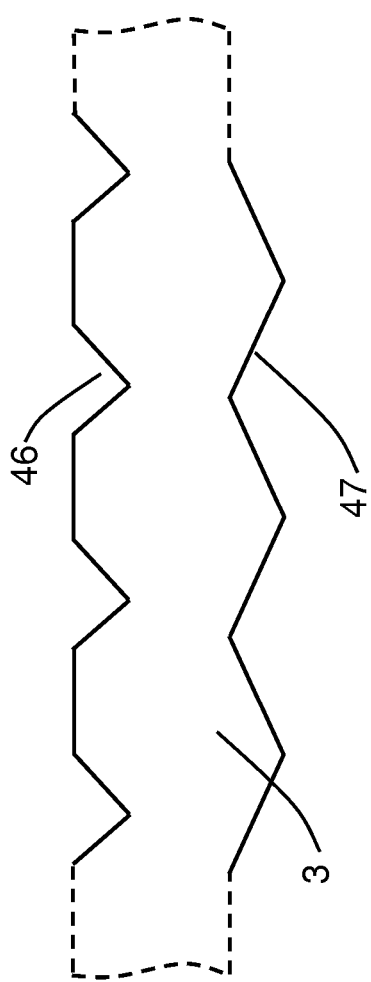
FIG. 12d is a cross section representation of a light guide having grooves with different pitch and apex angles on top and bottom major surfaces in accordance with an embodiment of the present invention.

Alternatively, the pitch of the grooves on the top or bottom major light guide surface may be altered independently. FIGS. 12a-12c show various methods of changing groove pitch. FIG. 12a demonstrates altering the pitch by maintaining the apex angle 44 and varying the depth 43 of the grooves; FIG. 12b demonstrates altering the pitch 39 by maintaining the depth 43 of the groove and varying the apex angle 44; FIG. 12c demonstrates the pitch 39 of the grooves being altered by maintaining the dimensions of each individual groove, but allowing flat regions 45 to be created in between the grooves. The application of each method of variation of the groove pitch is not restricted to one per light guide and may apply differently to grooves on the top or bottom surfaces, or even to grooves on the same surface at different locations of the light guide. Nor is the method of pitch variation restricted to being the same for the sets of grooves located directly opposite each other on the top and bottom major surface of the light guide. An example of this is shown on a cross-section of the light guide 3, made parallel to the light input face, in FIG. 12d, where the grooves on the top surface 46 have a different pitch and pitch variation method to those located on the bottom major surface 47.

Figure 13A:
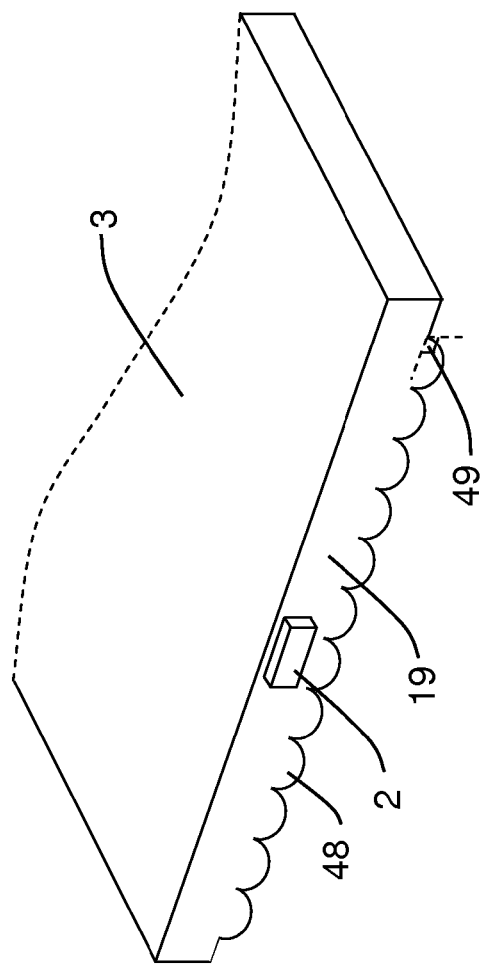
FIG. 13a is a perspective view of the light input face of a light guide having grooves with a circular or elliptical cross section in accordance with an embodiment of the present invention.

The cross-section of the groove may be other shapes than triangular. They may also be formed from an arc shape 48 as shown in FIG. 13a. This may be circular or elliptical and it would be expected that the preferred shape has an intersection angle 49 to the major surface of the light guide of 90° or less.

Figure 13B:
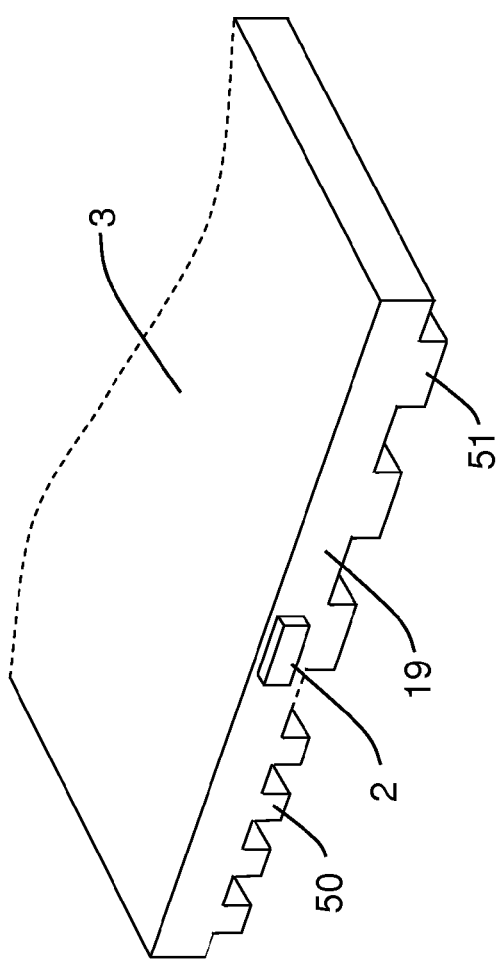
FIG. 13b is a perspective view of the light input face of a light guide having grooves with a square or rectangular cross section in accordance with an embodiment of the present invention.

FIG. 13b shows another possible cross-section shape being a square 50 or rectangle 51 creating a square wave grating structure if viewed from the end of the groove. By this arrangement, the grating structure may look like a flat major surface with protrusions, but should be treated as a multiple groove, grating structure.

Figure 13C:
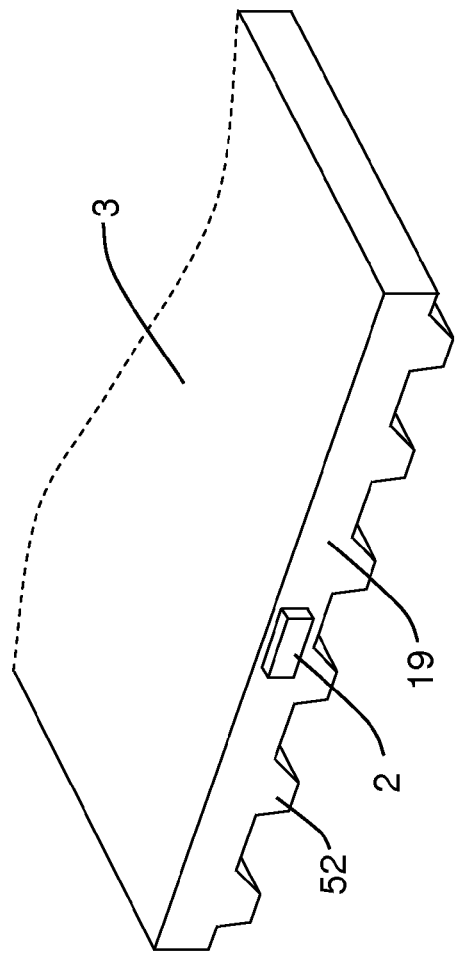
FIG. 13c is a perspective view of the light input face of a light guide having grooves with a trapezoidal cross section in accordance with an embodiment of the present invention.

FIG. 13c shows a further possible cross-section, a trapezoid 52 in general, i.e. the angles of the portion of the groove furthest from the light guide 3 do not need to be restricted to 90°.

Figure 13D:
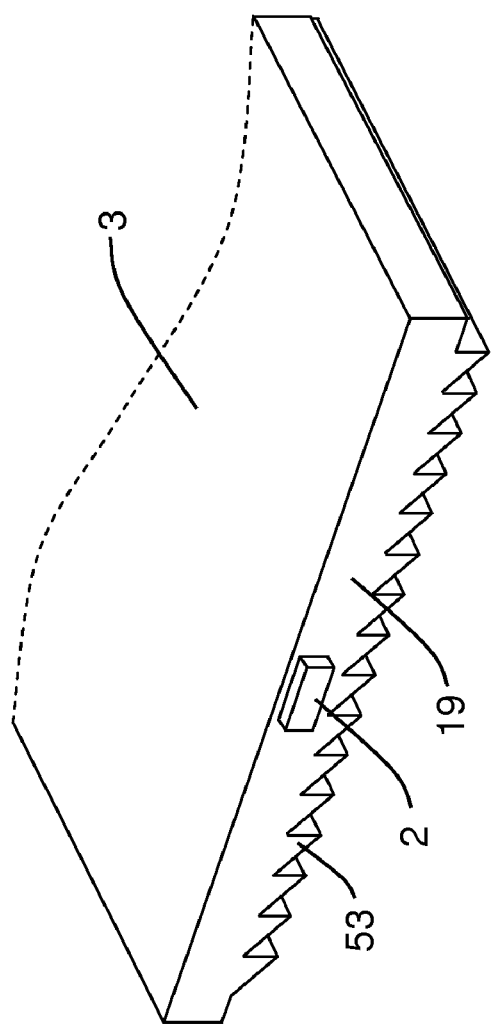
FIG. 13d is a perspective view of the light input face of a light guide having grooves with a non-isosceles triangular cross section in accordance with an embodiment of the present invention.

The cross-section may also be triangular but with different angles at the each of the points of contact with the major surface of the light guide. As such the cross section is no longer of an isosceles triangle and an example shape 53 is shown in FIG. 13d being a saw-tooth profile. The only restriction is that the non-apex angles are greater than 0° and less than 90°.

The light sources 2 need not be limited to white LEDs. Linear sources such as compact fluorescent tubes or other point sources such as lasers may be used. Any light source 2 that couples light into the light guide such that the emitted light will TIR is suitable.

Figure 14:
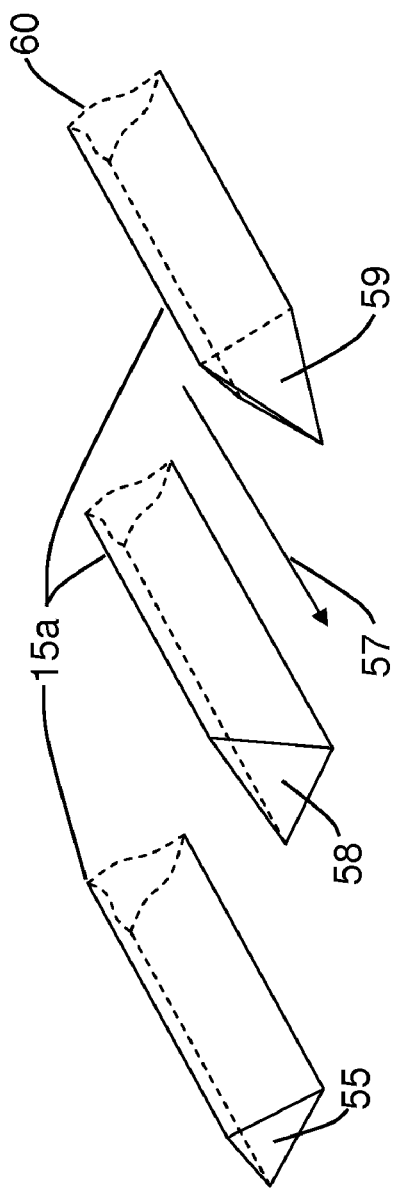

Although the grooves may be applied to the entire lower surface of the light guide 3, it is not actually necessary that they run to the edge of the light guide before terminating. They may be terminated at any point on the light guide major surface and by ending at such a point leave a flat region of the major surface of the light guide 3 after the end of the groove. The grooves shown in FIG. 7 as dashed lines all terminate before the end of the light guide, most particularly at 54. The termination face may act as an extraction feature and the particular shape may determine the extracted angular distribution of the light. Therefore, in a further embodiment of the invention, the end face 55 of the groove may be vertical and perpendicular to the direction of the groove 57 as represented in FIG. 14. The grooves are viewed as if from beneath, therefore the apex 15a is uppermost in the diagram. Similarly, for clarity, the light direction is assumed to be generally along the direction indicated by the arrow 57, therefore the groove termination point is to the front of the diagram. Alternately, as also shown in FIG. 14 the groove may taper back into the light guide and this taper may either take on the form of a flat face 58, or maintain the cross-section shape 59 of the groove throughout the length of the taper. The groove cross-section is shown as a triangle by way of example, but should not be limited to this cross-section. The curved, dashed lines 60 at the upper right end of each of the grooves are not a termination surface, rather demonstrate that the grooves may have any length.

The end face may take on either aspect of the first two shapes, but have an orientation other than perpendicular to the groove direction 57, an example of which is shown as 61 in FIG. 15. As another alternative, the end face of the groove may take the form of a hemi-sphere, or elliptical aspect 62 as also shown in FIG. 15.

Extraction of the light from the light guide may be achieved by the addition of extraction features to the walls 63 of the grooves themselves as shown in FIG. 16. These extraction features may, for example, take the form of an indent 64, or a protrusion 65 or simply a rough patch 66 on the surface of the groove, indicated by diagonal, solid shading. The shape is not important, but the fact that the disruption of the surface profile of the groove changes the angle of incidence of the light onto the groove surface will cause extraction. In this manner the extraction features act in an identical fashion to those used in a typical backlight 4 as represented in FIG. 1.

Figure 17:
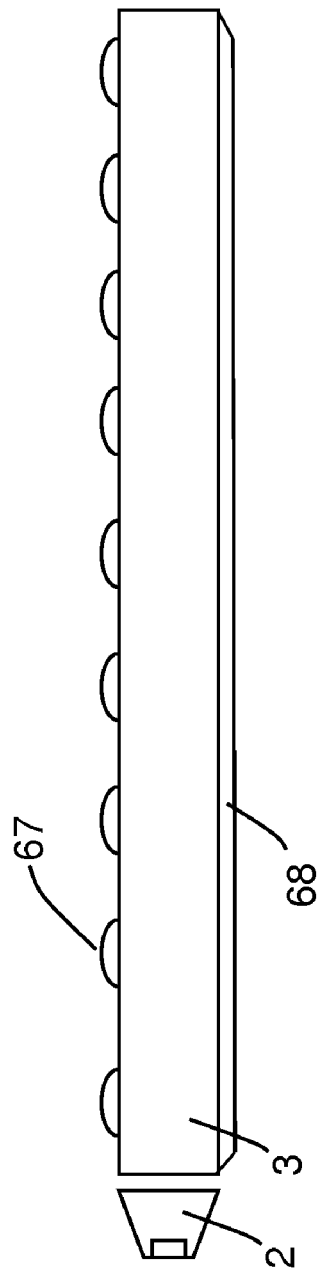
FIG. 17 is a side view of a light guide with scattering features on a major side of the light guide opposite the grooves in accordance with an embodiment of the present invention.

Alternatively, the scattering features 67 may be located on the opposing surface of the light guide 3 as shown in FIG. 17. Again such scattering features would extract light in the same way as a typical extraction feature on a light guide with an otherwise flat major surface. Again, the shape of the extraction feature is not important. The groove is shown as 15 and is drawn as viewed from the side.

Figure 18:
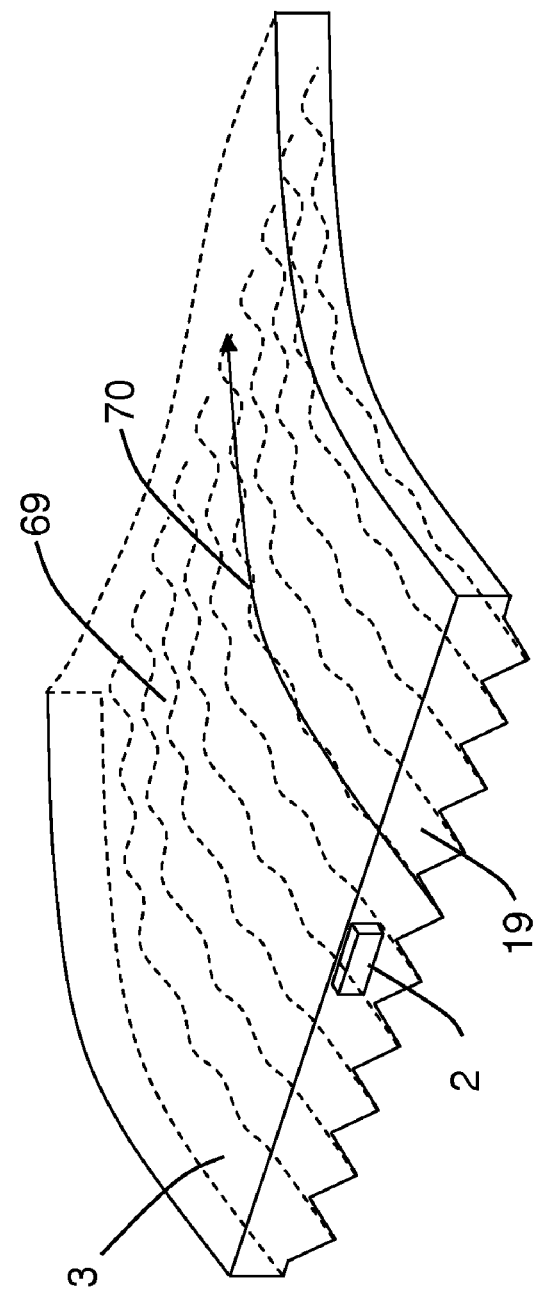
FIG. 18 is a schematic illustration of a light guide having short term oscillations in groove direction in accordance with an embodiment of the present invention.

FIG. 18 shows a further embodiment of the invention whereby the short term groove direction, denoted by the dashed line 69, oscillates rapidly around the longer term average direction 70 of the groove, denoted by the solid arrow, in the plane of the major surface of the light guide. This long term groove direction is shown as curved, but may also be straight, and the form of the curve is not restricted. The angle between short term direction of a groove and the average direction of the light at that particular location will control the strength of the extraction at that point. In such an arrangement overall direction of the grooves may still be used to sub-guide light around the light guide on a larger scale whilst short term oscillation of the grooves may be used to simultaneously extract light.

Figure 19:
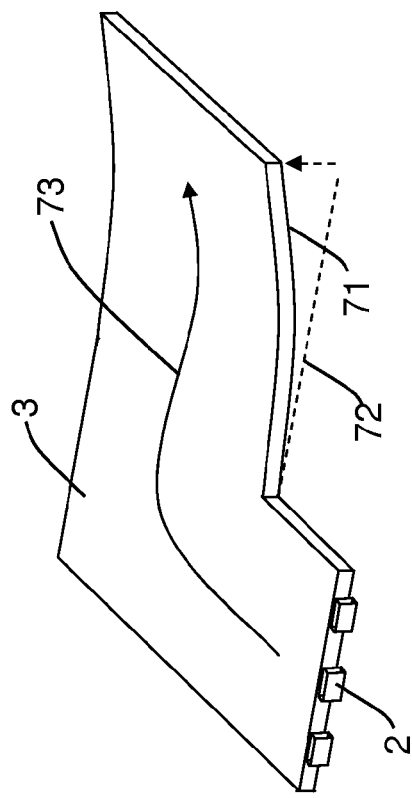
FIG. 19 is a perspective view of a light guide having a curve out of the initial plane of the major surface in accordance with another embodiment of the present invention.

FIG. 19 represents a further embodiment of the invention where the grooves are utilised on a light guide 3 which has a curvature 71 out of the initial plane of the major surface denoted by the dashed line 72. The application of the grooves will not alter the guiding out of plane in such a case, allowing control of uniformity of light guides with out of plane, curved, novel shapes. The likely groove direction in this example is shown by the solid arrow 73.

Figure 20:
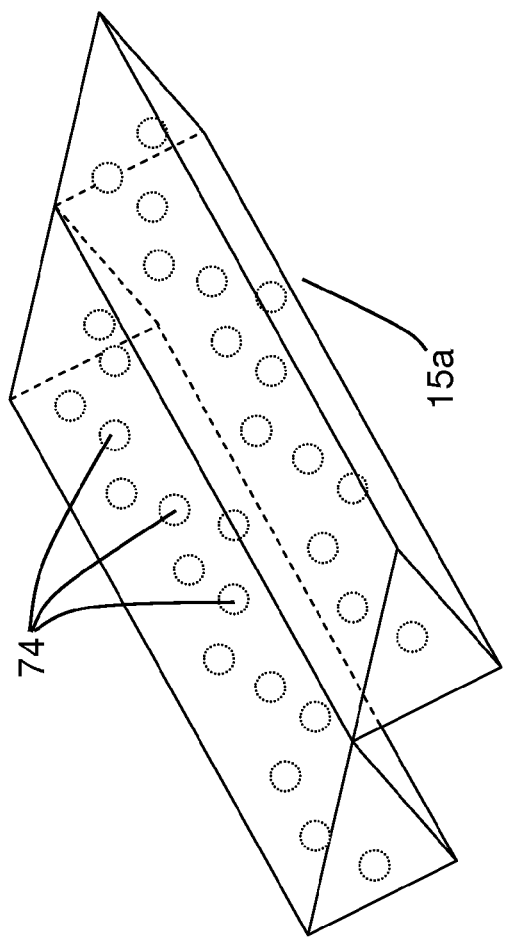
FIG. 20 is a schematic view of a light guide with extraction features within the grooves in accordance with another embodiment of the present invention.

The grooves may be formed from a master mold in an injection molding process. Alternatively, the grooves may be printed directly onto a flat light guide surface using a transparent resin-type material that is substantially optically matched to the material of the light guide and may be set or formed into the required shapes either at that time or at a later stage. By this method of groove formation extraction features may be comprised of beads of a second material 74, or cavities filled with a different refractive index second material, such as air, also 74 mixed into the first resin-type material that may scatter the sub-guided light, as shown in FIG. 20. The groove apex is shown by 15a. Alternatively, the extraction features may be comprised of phosphor particles. These would act as both extraction features and colour conversion centers allowing the use of light sources that have short wavelength, or laser light sources.

FIG. 21 shows a further embodiment of the invention whereby the grooves undergo a change in direction 78 greater than 90°. The apexes are denoted by dashed lines 77. The light guide 3 is in plan view with a light source marked 2. In this instance the direction of the light, solid arrows 79, may be turned by a similar angle to the grooves within the light guide, allowing for a possible reversal in the direction of the light, i.e. back towards the light input face. This is something that will not be possible in a light guide with no grooves on the major surfaces. The grooves are shown as taking a fountain-like structure, by way of example, to demonstrate that the reversal of the groove direction may not need to apply to all grooves within the structure. The angle associated with the change in direction may be of any value and in principle does not have an upper limit.

An arrangement, such as that shown in FIG. 21, may be useful within a light guide that is illuminated by point sources, e.g. LEDs or lasers, to improve brightness uniformity. In this case a finite length section of the light guide, called the mixing region is required to allow the light from the separate light sources to become fully homogenised, 84 in FIG. 22. The areas 85 outside of the light cones of the light sources, which are bounded by the dashed lines 86, remains dark. By the addition of sub-guiding grooves into the light guide this region may be greatly reduced or eliminated altogether by re-directing a portion of the light from each light source back into the region 85 which may then be extracted by normal methods, e.g. 67 in FIG. 17.

In accordance with the invention, the light guide 3 as described herein with respect to FIGS. 2-22 can be used as part of a display including a backlight and spatial light modulator in much the same manner represented in FIG. 1. Moreover, the light guide 3 may be used in various other applications without departing from the scope of the invention. For example, the light guide 3 may be part of a distributed illumination panel for providing distributed light.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A light guide for use in distributing light received from a light source, comprising:
   a plate-like substrate through which light may travel, the substrate having a top major surface, a bottom major surface and a light input face;
   wherein the substrate includes at least one region where light received at the light input face cannot reach by direct optical path through the substrate to the at least one region; and
   the substrate further includes a plurality of grooves on at least one of the top major surface and the bottom major surface, the plurality of grooves being aligned in a direction which is parallel to a direction of the light input at the light input face, and the plurality of grooves including grooves having a direction which varies non-linearly so as to direct light from the light input face toward the at least one region.

2. The light guide according to claim 1, wherein the substrate is non-rectangular.

3. The light guide according to claim 1, wherein the substrate comprises an in-plane turn having a radius of curvature, a straight-line path from the light input face to the at least one region traverses a gap in the substrate formed by the radius of curvature, and the grooves included among the plurality of grooves vary in direction in conjunction with the radius of curvature.

4. The light guide according to claim 1, wherein the substrate comprises an L-shape, a straight-line path from the light input face to the at least one region traverses a gap in the substrate formed by an inner angle of the L-shaped substrate, and the grooves included among the plurality of grooves vary in direction in conjunction with a path along the inner angle.

5. The light guide according to claim 1, wherein the substrate comprises a hole extending thru the top and bottom major surfaces, the at least one region exists on a side of the hole opposite a side adjacent the light input face, and the grooves included among the plurality of grooves vary in direction to direct the light from the light input face to the at least one region.

6. The light guide according to claim 1, wherein the substrate comprises a cut made into a minor side wall of the substrate extending thru the top and bottom major surfaces, the at least one region exists on a side of the cut opposite a side adjacent the light input face, and the grooves included among the plurality of grooves vary in direction to direct the light from the light input face to the at least one region.

7. The light guide according to claim 1, wherein the substrate has an hour glass shape.

8. The light guide according to claim 1, wherein the grooves having a direction which varies non-linearly include grooves which undergo a change in direction greater than 90°.

9. The light guide according to claim 1, further comprising extraction features for extracting light from the light guide.

10. The light guide according to claim 9, wherein the extraction features include at least one of an indent, protrusion or rough patch on a surface of one or more of the plurality of grooves.

11. The light guide according to claim 9, wherein the extraction features include protrusions on a surface of the light guide opposite the surface including the plurality of grooves.

12. The light guide according to claim 1, wherein the plurality of grooves represent elongated lenses.

13. The light guide according to claim 1, wherein at least one of the pitch and number of the grooves directing the light toward the at least one region changes.

14. The light guide according to claim 1, wherein at least one of an apex angle and spacing of the grooves directing the light toward the at least one region changes.

15. The light guide according to claim 1, wherein the plurality of grooves includes grooves formed on the top major surface and grooves formed on the bottom major surface.

16. The light guide according to claim 15, wherein the grooves formed on the top major surface are interleaved with the grooves formed on the bottom major surface.

17. The light guide according to claim 1, wherein the plurality of grooves have a cross-section that is at least one of triangular, arcuate, rectangular or square.

18. The light guide according to claim 1, further comprising a mixing region at the light input face to enable light from separate light sources to become more homogenised.

19. A backlight, comprising:
a light guide according to claim 1; and
at least one light source providing the light input at the light input face.

20. A backlight according to claim 19, wherein:
the at least one light source comprises a plurality of light sources positioned along the light input face for introducing light into the light guide; and
the grooves included among the plurality of grooves vary in direction to direct light received from a given one of the plurality of light sources into the at least one region represented by an area in the substrate between the given light source and an adjacent one of the plurality of light sources, the area being an area which would otherwise not receive light from the plurality of light sources.

21. The backlight according to claim 20, the plurality of grooves including additional grooves aligned to direct light received from the adjacent light source into the area between the given light source and the adjacent light source where the light from the given light source and the adjacent light source becomes mixed.

22. The backlight according to claim 20, wherein the grooves directing the light received from the given light source into the area exhibit a change in direction greater than 90°.

23. The backlight according to claim 20, wherein the substrate includes extraction features within the area for extracting light from the light guide.

24. A display, comprising:
a transmissive spatial light modulator in stacked combination with a backlight according to claim 19.

* * * * *